United States Patent
Yamamoto (10) Patent No.: US 11,404,716 B2
(45) Date of Patent: Aug. 2, 2022

(54) LITHIUM ION SECONDARY CELL AND METHOD FOR PRODUCING ACTIVE MATERIAL

(71) Applicant: TOYOTA JIDOSHA KABUSHIKI KAISHA, Toyota (JP)

(72) Inventor: Yuji Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 16/748,103

(22) Filed: Jan. 21, 2020

(65) Prior Publication Data
US 2020/0259208 A1    Aug. 13, 2020

(30) Foreign Application Priority Data
Feb. 8, 2019    (JP) .............................. JP2019-021516

(51) Int. Cl.
*H01M 10/0525*    (2010.01)
*H01M 4/131*    (2010.01)
*H01M 4/36*    (2006.01)
*H01M 4/485*    (2010.01)
*H01M 4/02*    (2006.01)

(52) U.S. Cl.
CPC ....... *H01M 10/0525* (2013.01); *H01M 4/131* (2013.01); *H01M 4/366* (2013.01); *H01M 4/485* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2009/0087731 A1    4/2009    Fukui et al.

FOREIGN PATENT DOCUMENTS

| JP | 2008226463 A | 9/2008 |
| JP | 2009099523 A | 5/2009 |
| JP | 2014-22204 A | 2/2014 |

*Primary Examiner* — Wyatt P McConnell
(74) *Attorney, Agent, or Firm* — Dickinson Wright, PLLC (57) ABSTRACT

The art disclosed herein provides a lithium ion secondary cell in which the internal resistance of the secondary cell is further reduced. A lithium ion secondary cell includes electrodes including an active material. The active material includes, on the surface, two coating layers of a metal oxide layer including a metal oxide and an ion conductive layer including a lithium ion conductor. The metal oxide layer and the ion conductive layer are adjacent to each other.

9 Claims, 4 Drawing Sheets

LITHIUM ION SECONDARY CELL AND METHOD FOR PRODUCING ACTIVE MATERIAL

CROSS REFERENCE TO RELATED APPLICATIONS

This application claims priority based on Japanese Patent Application No. 2019-021516 filed on Feb. 8, 2019, the entire contents of which are incorporated herein by reference.

BACKGROUND

The present disclosure relates to a lithium ion secondary cell and a method for/producing an active material, Demand for improvement of various characteristics corresponding to applications of lithium ion secondary cells further increases as the commercialization thereof progresses. For example, where a large amount of lithium ions could be smoothly and instantaneously inserted in and removed from an active material that occludes and releases charge carriers in a secondary cell, the internal resistance of the cell could be reduced. Therefore, for example, it has been proposed to coat the surface of active material particles contained in a positive electrode and a negative electrode with a material having lithium ion conductivity (see, for example, Japanese Patent Application Publication No. 2014-22204).

Generally, a positive electrode active material and a negative electrode active material have a layered structure, and lithium ions as charge carriers are occluded between the layers of the active material. For this reason, the movement of lithium ions inside the positive electrode active material and the negative electrode active material is limited to the plane direction between the layers and the movement of lithium ions at the time of insertion in and removal from the active material is also in this direction, so that the is insertion and removal can be performed smoothly. Here, in the case of a lithium ion conductive material, the lithium ion can move inside thereof with a low resistance without being restricted in the direction. Therefore, by covering the surface, of the active material particles with a lithium ion conductive material, lithium ions from all directions can be smoothly inserted in and removed from between the layers of the active material, and the internal resistance can be reduced. However, according to the study by the present inventors, there is still room for improvement in reducing the internal resistance of the cell based on the configuration of the active material.

The present disclosure has been accomplished with the foregoing m view, and an object thereof is to provide a lithium ion secondary cell in which the internal resistance of the secondary cell is further reduced. Another Object of the present disclosure is to provide a method for producing an active material for use in a lithium ion secondary cell.

SUMMARY

The art disclosed herein provides a lithium ion secondary cell comprising an electrode including an active material. In this secondary cell, the active material has two coating layers on the surface, namely, a metal oxide layer including a metal oxide and an ion conductive layer including a lithium ion conductor. The metal oxide layer and the ion conductive layer are adjacent to each other. In some embodiments, the metal oxide constituting the metal oxide layer and the lithium ion conductor constituting the ion conductive layer are in contact with each other on the surface of the positive electrode active material. According to such a configuration, a lithium ion-rich portion in which the density of lithium ions is locally and relatively high and a lithium ion-deficient portion in which the density of lithium ions is locally and relatively low are formed in the ion conductive layer adjacent to the metal oxide layer. Through such lithium ion-rich portion and lithium ion-deficient portion, lithium ions can be inserted in and removed from the positive electrode active material with low resistance. By configuring the electrode with such an active material, the internal resistance of the cell can be further reduced.

In some embodiments of the art disclosed herein, the metal oxide, includes at least one, selected from the group consisting of titanium oxide, aluminum oxide, silicon dioxide, and tungsten oxide. Thereby, a metal oxide layer suitable for the present art can be formed.

In some embodiments of the art disclosed herein, the lithium ton conductor includes at least one selected from the group consisting of lithium phosphate lithium sulfate, lithium tungstate, lithium silicate, lithium cobaltate, lithium aluminate, and lithium titanate. Thereby, an ion conductive layer suitable for the present art can be formed.

In some embodiments of the art disclosed herein, where an electronegativity of a central element of the metal oxide is denoted by $\chi M$ and an electronegativity of a central element of the lithium ion conductor is denoted by $\chi M'$, these satisfy $102\ M < 102\ M'$. Thereby, a cell with lower resistance can be formed.

In some embodiments of the art disclosed herein, where the active material is taken as 100 parts by mass, the ratio of the ion conductive layer is 0.05 parts by mass or more and 5 parts by mass or less. Thereby, both reduction in resistance and improvement in capacity retention ratio can be achieved.

In some embodiments of the art disclosed herein, where the ratio of the ion conductive layer is taken as 100 parts by mass, the ratio of the metal oxide layer is 80 parts by mass or more and 120 parts by mass or less. As a result, ratio of a resistance component is suppressed to a low value and the abovementioned configuration can be suitably realized.

In some embodiments of the art disclosed herein, when a cross section of the active material is observed, the product $l \times m$ $(nm^2)$ of a length l (nm) of a contact surface between the ion conductive layer and the active material and the maximum thickness m (nm) of the ion conductive layer satisfies $100 \leq l \times m \leq 20{,}000$. Thereby, a suitable shape of the ion conductive layer is realized, the ratio of the resistance component is suppressed to a low value, and the abovementioned effect can be obtained.

In another aspect, the art disclosed herein provides a method for producing an active material for a lithium ion secondary cell. This manufacturing method includes coating a part of a surface of active material particles capable of occluding. and releasing lithium ions with, a lithium ion conductor to form an ion conductive layer, and then coating another part of the surface of the active material particles where the ion conductive layer has been formed with a metal oxide to form a metal oxide layer adjacent to the ion conductive layer. With such a configuration, an active material suitable for the cell can be efficiently manufactured.

DETAILED DESCRIPTION

Hereinafter, some embodiments of the present disclosure will be described. It should be noted that matters other than those specifically mentioned in the present description and necessary for the implementation of the present disclosure (for example, secondary cell components such as a positive electrode and a negative electrode, general manufacturing process of the cell, and the like that do not characterize the present disclosure) can be found as design matters by a person skilled in the art on the basis of the related art in the pertinent field. The present disclosure can be carried out based on the contents disclosed in this description and common technical knowledge in the pertinent field. Note that the description "A to B" indicating a numerical range means "A or more and B or less".

In the present description, the "lithium ion secondary cell" refers to a cell in general that uses lithium ions as an electrolyte and that can be repeatedly charged and discharged along with the movement of charges between the positive and negative electrodes by the lithium ions. The electrolyte in the lithium ion secondary cell may be, for example, a gel electrolyte a solid electrolyte, or an electrolyte. Such lithium ion secondary cells are inclusive of lithium polymer cells, lithium ion capacitors and the like in addition to cells generally referred to as lithium ion cells and lithium secondary cells. Hereinafter, the art disclosed herein will be described by taking as an example the case where the lithium ion secondary cell is a nonaqueous electrolyte secondary cell.

Lithium Ion Secondary Cell

Figure 1:
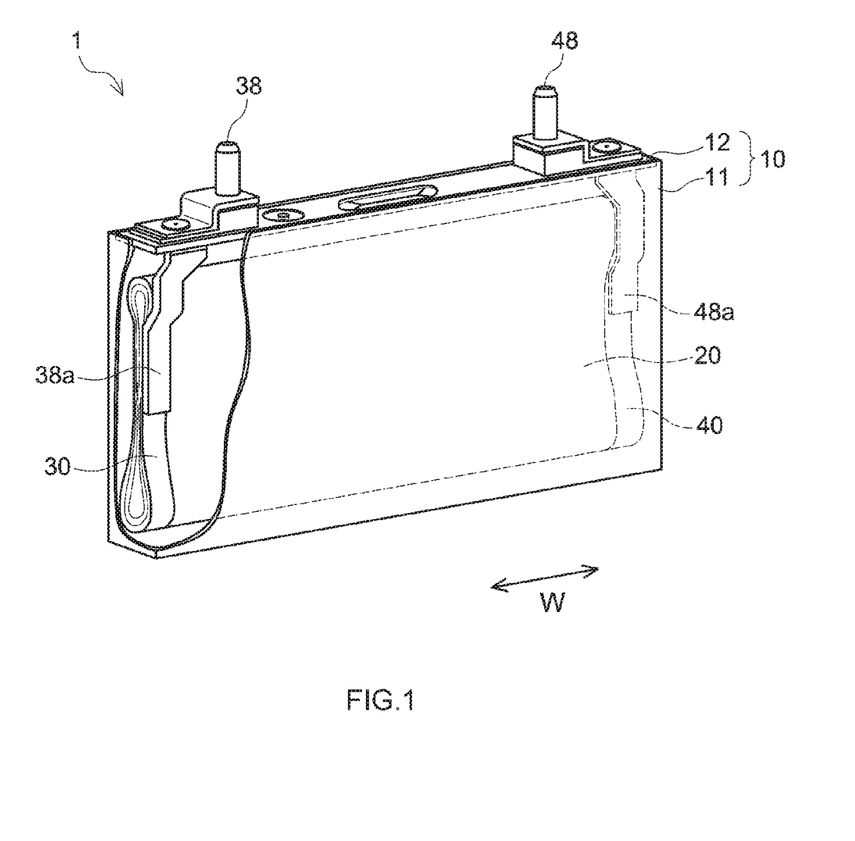
FIG. 1 is a schematic perspective view in which a secondary cell according to an embodiment is partially cut away.

FIG. 1 is a cutaway perspective view showing the configuration of a lithium ion secondary cell 1 disclosed herein. The lithium ion secondary cell 1 is configured by accommodating a wound electrode body 20 including a positive electrode 30 and a negative electrode 40 in a cell case 10 together with a nonaqueous electrolyte (not shown). W in the figure indicates the width direction of the cell case 10 and the wound electrode body 20 and coincides with the winding axis WL of the wound electrode body 20 shown in FIG. 2. The wound electrode body 20 includes the positive electrode 30, the negative electrode 40, and two separators 50.

The positive electrode 30 includes a positive electrode current collector 32 and a positive electrode active material layer 34. The positive electrode active material layer 34 is provided on a part of the surface (one side or both sides) of the positive electrode current collector 32. The positive electrode current collector 32 is provided with a non-coated portion 32A where the positive electrode active material layer 34 is not formed and the positive electrode current collector 32 is exposed for current collection. The positive electrode active material layer 34 is a porous body including a positive electrode material 100 described later, and can be impregnated with an electrolyte. The positive electrode current collector 32 is a member that holds the positive electrode active material layer 34 and serves for collecting charges from the positive electrode active material layer 34 as the positive electrode active material layer 34 releases lithium ions. In some embodiments, the positive electrode current collector 32 is composed of an electrically conductive member that is electrochemically stable in the positive electrode environment in the cell and is made of a metal having good electric conductivity (for example, aluminum, nickel, titanium, stainless steel and the like).

Figure 3:
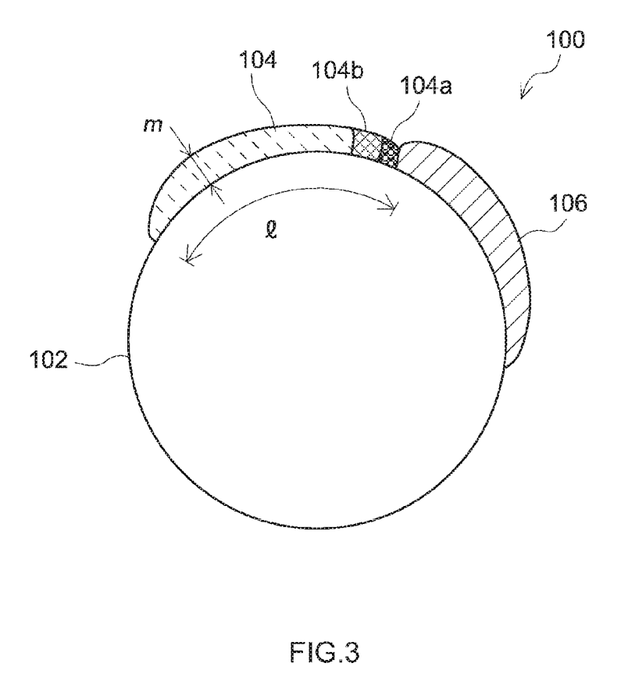
FIG. 3 is a cross-sectional view schematically illustrating the configuration of an electrode material according to an embodiment.
Figure 4A:
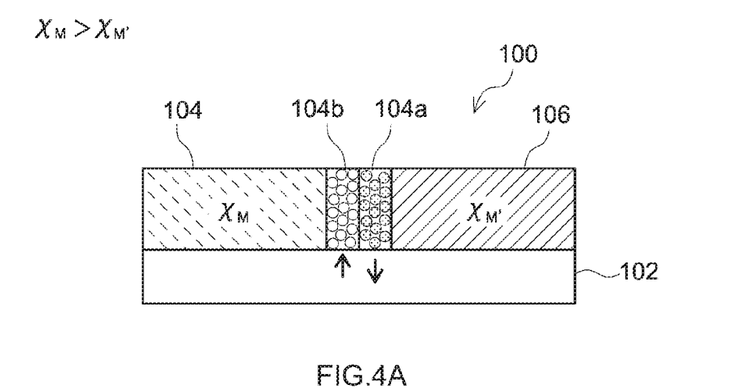
FIG. 4A is a conceptual diagram illustrating the contribution of electronegativity ($\chi M > 102\ M'$) of the ion conductive layer and the metal oxide layer in the electrode material.
Figure 4B:
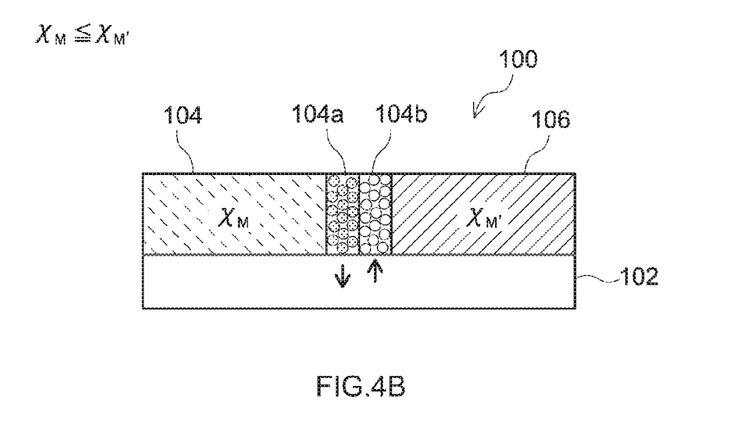
FIG. 4B is a conceptual diagram illustrating the contribution of electronegativity ($\chi M \leq \chi M'$) of the ion conductive layer and the metal oxide layer in the electrode material.

FIG. 3 is an enlarged cross-sectional view of a main part for explaining the configuration of the electrode material 100 that is characteristic in the present art. FIGS. 4A and 4B are enlarged cross-sectional views of main parts schematically representing the configuration of the electrode material 100. In the present embodiment, the active material is, for example, a positive electrode active material. The electrode material 100 includes, for example, a particulate positive electrode active material (hereinafter sometimes referred to as active material particles 102). The active material particles 102 are provided with two coating layers of an ion conductive layer 104 and a metal oxide layer 106 on the surface thereof. In other words, a part of the surface of the active material particle 102 is directly covered with two coating layers of the ion conductive layer 104 and the metal oxide layer 106. The positive electrode active material is a material into which lithium ions that are charge carriers can be inserted and from which the lithium ions can be removed. The lithium ions are released into the electrolyte or occluded from the electrolyte. Various materials conventionally used as the positive electrode active material of lithium ion secondary cells can be used without any particular limitation as the positive electrode active material. Some embodiments of the positive electrode active material include oxides (lithium transition metal oxides) including lithium and a transition metal element as constituent metal elements, such as lithium nickel oxide (for example, $LiNiO_2$), lithium cobalt oxide (for example, $LiCoO_2$), lithium manganese oxide (for example, $LiMn_2O_4$), and composites thereof (for example, $LiNi_{0.5}Mn_{1.5}O_4$, $LiNi_{1/3}Co_{1/3}Mn_{1/3}O_2$), phosphates including lithium and a transition metal element as constituent metal elements, such as lithium manganese phosphate ($LiMnPO_4$), and lithium iron phosphate ($LiFePO_4$), and the like.

The ion conductive layer 104 includes a lithium ion conductor. The lithium ion conductor is a term that comprehensively means a solid substance in which lithium ions diffuse at a temperature sufficiently lower than the melting point thereof (for example, room temperature; 25° C.). Although not necessarily limited thereto, the lithium ion conductor may be a material having an ion conductivity of lithium ions of $10^{-12}$ S/cm or higher at room temperature (25° C.), and the ion conductivity may be, for example, $10^{-10}$ S/cm or higher, $10^{-8}$ S/cm or higher, $10^{-6}$ S/cm or higher, and $10^{-4}$ S/cm or higher. However, the lithium ion conductor can be a material having a lower ion conductivity of lithium ions (for example, a material having an ion conductivity of 1/10 or less) than the above-described positive electrode active material or a negative electrode active material described hereinbelow. Suitable examples of such lithium ion conductors include, but are not limited to, lithium phosphates such as trilithium phosphate ($Li_3PO_4$: LPO), lithium sulfate ($Li_2SO_4$), lithium tungstate ($Li_2WO_4$), lithium silicates such as lithium metasilicate ($Li_2SiO_3$) and tetralithium silicate ($Li_4SiO_4$), lithium cobaltate ($LiCoO_2$). lithium aluminate ($LiAlO_2$), lithium titanate ($Li_4Ti_5O_{12}$)), compounds obtained by substituting a part of Li in these compounds with one or two or more lanthanoid elements (for example, $La_{2/3-x}Li_3xTiO_3$) and compounds obtained by substituting a part of or the entire non-Li element with one or two or more transition metal elements (for example, $Ln_{1/3-x}Li_x(Nb_{1-y}Ti_y)O_3$, where Ln is a lanthanoid element and x and y are real numbers of 0 to 1). In one embodiment, a Li ion conductive oxide having a perovskite crystal structure can be used as the lithium ion conductor of the present art. The chemical formula shown in parentheses after the compound name is a representative composition of the compound, and the compound is not necessarily limited to this composition. In some embodiments, 50% by mass or more of the ion conductive layer 104 is made of a lithium ion conductor and, for example, 80% by mass or more, 90% by mass or more, and in one example 95% by mass or more can be configured of the lithium ion conductor. The configuration in which particles having lithium ion conductivity are adhered to the surface of the active material particle 102 in a layer form with a binder or the like does not exhibit the features of the present disclosure due to the grain boundaries and, therefore, is not included in the ion conductive layer 104 referred to herein.

The metal oxide layer 106 includes a metal oxide. The metal oxide is a term that comprehensively means an oxide of one kind or two or more kinds of metals. However, the metal oxide can be a material in which the ion conductivity of lithium ions is lower than that of the above-described positive electrode active material the negative electrode active material described hereinbelow, and the lithium ion conductor (for example, the ion conductivity 1/1000 or less relative to that of the lithium ion conductor, or for example, materials having a lithium ion conductivity of less than $10^{-10}$ S/cm). From the viewpoint of clarity, the metal oxide may be a material that does not have lithium ion conductivity, for example, may be a material that does not include a lithium atom. For example, the metal oxide may be an insulating material that has neither lithium ion nor electron conductivity (for example, a material having a lithium ion conductivity of less than $10^{-10}$ S/cm and an electrical resistivity of $10^{12}$ Ωcm or more). Examples of such metal oxides include, but are not limited to, titanium oxide ($TiO_2$, TiO), aluminum oxide ($Al_2O_3$), silicon oxide ($Si_2O_3$, SiO), tungsten oxide ($W_2O_3$, $WO_2$, $WO_3$), and the like. The chemical for mala shown in parentheses after the compound name is a representative composition of the compound, and the compound is not necessarily limited to this composition. In some embodiments, 50% by mass or more of the metal oxide layer 106 is made of a metal oxide and, for example, 80% by mass or more, 90% by mass or more, and further 95% by mass or more can be configured of the metal oxide. The configuration in which metal oxide particles are adhered to the surface of the active material particle 102 in a layer form with a binder or the like does not exhibit the features of the present disclosure due to the grain boundaries and, therefore, is not included in the metal oxide layer 106 referred to herein.

The ion conductive layer 104 and the metal oxide layer 106 are adjacent to each other on the surface of the active material particles 102. The lithium ion conductor included in the ion conductive layer 104 and the metal oxide included in the metal oxide layer 106 both include oxygen atoms and metal atoms (hereinafter referred to as a central element) other than lithium (Li). The atomic nucleus of the central element essentially has a force to attract electrons, and the degree thereof, that is, the electronegativity, differs depending on the type of the central element. Lithium ions ($Li^+$) can easily move in the ion conductive layer 104. Here, the electronegativity of the central element in the lithium ion conductor is represented by χM, and the electronegativity of the central element in the metal oxide is represented by χM'.

As shown in FIG. 4A, where the electronegativity $χ_M'$ of the central element in the metal oxide is smaller than the electronegativity χM of the central element in the lithium ion conductor (χM>χM'), the force that attracts electrons in the metal oxide layer 106 can be weak relative to that in the ion conductive layer 104. At this time, since lithium ions ($Li^+$) easily move in the ion conductive layer 104, lithium ions ($Li^+$) that are cations are attracted to the vicinity of the interface with the metal oxide layer 106 in the ion conductive layer 104. Therefore, the lithium-rich portion 104a having a locally high $Li^+$ concentration is likely to be formed. Consequently, lithium ions ($Li^+$) are pulled out in the vicinity of the lithium rich portion 104a on the side opposite to the interface, so that a lithium-deficient portion 104b having a locally low $Li^+$ concentration is formed. The lithium-rich portion 104a and the lithium-deficient portion 104b generally can be formed perpendicular (90°) or with an inclination of 90°±45° (in one embodiment, 90°±15°) with respect to the surface of the active material particle 102. Such a lithium-rich portion 104a can express, for example a lithium ion donating property with respect to the active material particles 102. Further, such a lithium-deficient portion 104b can express, for example, a lithium ion attracting property with respect to the active material particles 102. Thus. the lithium-rich portion 104a and the lithium-deficient portion 104b can be a conduction path providing a higher lithium ion conductivity than the periphery. By continuously forming such lithium-rich portion 104a and lithium deficient portion 104b in the coating layer on the surface of the active material particle 102, the conductivity of lithium ions on the surface is locally increased. As a result, lithium ions can be more smoothly inserted into the active material particles 102 from the lithium-rich portion 104a. Further, lithium ions can be more smoothly desorbed from the active material particles 102 to the lithium-deficient portion 104b. In other words, the resistance accompanying charging/discharging of the active material particles 102 can be reduced.

As shown in FIG. 4B, where the electronegativity χM' of the central element in the metal oxide is equal to or larger than the electronegativity χM of the central element in the lithium ion conductor (χM≤χM'), the force that attracts electrons in the metal oxide layer 106 can be strong relative to that in the ion conductive layer 104. Therefore, a force attracting electrons acts on the side of the ion conductive layer 104 at the interface with the metal oxide layer 106. Consequently, a force extracting lithium ions acts on the side of the ion conductive layer 104 away from the interface with the metal oxide layer 106. However, electrons cannot move as easily as lithium ions in the ion conductive layer 104. For this reason, a large force extracting lithium ions from the vicinity of the interface of the ion conductive layer 104 cannot be generated. As a result, the lithium-deficient portion 104b having a somewhat lower $Li^+$ concentration can be formed in the vicinity of the interface of the ion conductive layer 104. Then, in the vicinity of the lithium-deficient portion 104b on the side opposite to the interface, lithium ions ($Li^+$) are extracted, and the lithium-rich portion 104a having a somewhat higher $Li^+$ concentration can be formed. In this way, the lithium-rich portion 104a and the lithium-deficient portion 104b are formed in the coating layer on the surface of the active material particle 102. This increases the conductivity of lithium ions. As a result, lithium ions can be more smoothly inserted into the active material particles 102 from the lithium-rich portion 104a. Further, lithium ions can be more smoothly released from the active material particles 102 to the lithium-deficient portion 104b. In other words, the resistance accompanying charging/discharging of the active material particles 102 can be reduced.

The above description is to facilitate understanding of the formation mechanism of the lithium-rich portion 104a and the lithium-deficient portion 104b and the operational effects in the present art. In practice, the formation modes of the lithium-rich portion 104a and the lithium-deficient portion 104b may be different. For example, even when the electronegativity of the central element of the lithium ion conductor and the metal oxide is the same, since the lithium, ion conductor includes a lithium atom, the presence density of the central element is low. Further, electrons and lithium ions in the ion conductive layer 104 can be swung by the central. element in the metal oxide layer 106. Therefore even in the case of $\chi M=\chi M'$, in the vicinity of the interface of the ion conductive layer 104, lithium ions may be pulled out toward the metal oxide layer 106 to form the lithium-rich portion 104a, or on the side opposite to the interface, lithium ions may be extracted to form the lithium-deficient portion 104b. Even in such a case, as illustrated in the examples described later, the present art still exhibits the effect of reducing the resistance accompanying charging/discharging. However, this resistance reduction effect can be smaller when $\chi M \leq \chi M'$ than when $\chi M > 102\ M'$. Therefore, from the viewpoint of reducing the resistance, the electronegativity $\chi M'$ of the central element in the metal oxide can be smaller than the electronegativity $\chi M$ of the central element in the lithium ion conductor ($\chi M > \chi M'$). In the present description, the electronegativity of the central element is not limited to that described hereinabove, and for example, a Pauling,'s electronegativity can be adopted.

In such a positive electrode material 100, the average particle diameter ($D_{50}$) of the active material particles 102 is not particularly limited, and a material having the same particle diameter as that a a conventional positive electrode active material of this type can be used. The average particle diameter ($D_{50}$) of the positive electrode active material particles 102 is, for example 0.5 μm or more, 1 μm or more, for example, 3 μm or more, and 15 μm or less, 10 μm or less, for example, 8 μm or less.

The ion conductive layer 104 covering the active material particles 102 can be provided in the electrode material 100 at a certain ratio in order to reliably enhance the promoting action of lithium ion removal/insertion by the lithium-rich portion 104a and the lithium-deficient portion 104b. For example, where the mass of the active material particles 102 is taken as 100 parts by mass, the ion conductive layer 104 may be contained in a small amount, but may be 0.01 parts by mass or more, 0.03 parts by mass or more, 0.05 parts by mass or more, for example, 1 part by mass or more. From the viewpoint of increasing the capacity retention ratio of the cell, the ion conductive layer 104 may be included in an amount, exceeding 1 part by mass, for example, 5 parts by mass or more, or 10 parts by mass or more. However, since the ion conductive layer 104 has a lower lithium ion conductivity than the active material particles 102, and the lithium ion desorption insertion promoting action can also depend on the amount of the interface with the metal oxide layer 106, an excessive ratio of the ion conductive layer 104 is not effective from the viewpoint of reducing resistance. From this viewpoint, where the mass of the active material particles 102 is taken as 100 parts by mass, for example, the ratio of the ion conductive layer 104 can be 10 parts by mass or less, and may be 6 parts by mass or less, 5 parts by mass or less, for example, 4 parts by mass or less, but is not limited thereto.

The metal oxide layer 106 covering the active material particles 102 can be included in the electrode material 100 at a certain ratio in order to form the lithium-rich portion 104a and the lithium-deficient portion 104b in the ion conductive layer 104. Where the mass of the ion conductive layer 104 is taken as 100 parts by mass, the amount of the metal oxide layer 106 may be 0.25 parts by mass or more. From the viewpoint of forming the ion conductive layer 104 and the metal oxide layer 106 adjacent to each other, where the mass of the ion conductive layer 104 is taken as 100 parts by mass, the amount of the metal oxide layer 106 may be, for example, 80 parts by mass or more, 85 parts by mass or more, 90 parts by mass or more, for example, about 95 to 100 parts by mass, but is not necessarily limited thereto. However, the excessive inclusion of the metal oxide layer 106 can be a resistance component. Therefore, where the mass of the ion conductive layer 104 is taken as 100 parts by mass, the amount of the metal oxide layer 106 is suitably 2500 parts by mass or less and may be, for example, 110 parts by mass or less, 105 parts by mass or less, for example, 100 parts by mass or less.

The ion conductive layer 104 and the metal oxide layer 106 covering the active material particles 102 can be shaped to have a certain thickness (height) from the surface of the active material particle 102 in order to more effectively enhance the promoting action of lithium ion removal and insertion by the lithium-rich portion 104a and the lithium deficient portion 104b. For example, from the viewpoint of maintaining the crystal structure of the lithium ion conductor, the maximum thickness m of the ion conductive layer 104 may be 1 nm or more and may be 2 nm or more, for example, 4 nm or more. The upper limit of the maximum thickness of the ion conductive layer 104 is not particularly limited, but from the viewpoint of not inhibiting the original function of the active material, the maximum thickness is appropriately, for example, about 50 nm or less, and may be, for example, 10 nm or less. From the viewpoint of forming the lithium-rich portion 104a and the lithium-deficient portion 104b, the maximum thickness of the metal oxide layer 106 can also be equal to or greater than the maximum thickness m of the ion conductive layer 104.

From the viewpoint of reducing resistance, it is: important that the ion conductive layer 104 and the metal oxide layer 106 be in close contact with the active material particles 102 to cover the active material particles 102. For example, in the configuration in which a particulate ion conductor is adhered to or carried on the active material particles 102, the degree of adhesion between the ion conductor and the active material particles 102 is not sufficient. As a result, the advantageous effects of the present art cannot he obtained. In view of this, the ion conductive layer 104 may have, for example, a length (that is, an interface length) l of a contact surface with the active material particle 102 in the below-described cross section of the electrode material 100 of 50 nm or more. The length l of the contact surface may be 60 nm or more, 80 nm or more, for example, 100 nm or more. Thereby, for example, such a configuration can be distinguished from that in which the particulate ion conductor is adhered to or carried on the active material particles 102. Where the diameter of the active material particle 102 in the same cross section is denoted by D, the length l of the contact surface may be 1.6×D or less. Where the length l is 1.6×D or less, the ratio of the ion conductive layer 104 and the metal oxide layer 106 in the electrode material 100 can be suitably adjusted. The length l and the diameter D may be, but are not limited to, $l \le 1.5 \times D$, $l \le 1.4 \times D$, and for example, $l < 1.3 \times D$. Further, they may be, for example, $l \ge 0.1 \times D$.

Further, the product l×m (nm$^2$) with the maximum thickness m of the ion conductive layer 104 may be 50 or more, 100 or more, for example, 120 or more. However, in the ion conductive layer 104 in which the contact area length l and the maximum thickness m are excessively large, the effect of promoting insertion/removal of lithium ions by the lithium-rich portion 104a and the lithium-deficient portion 104b formed in the vicinity of the interface with the metal oxide layer 106 will be reduced. From such a viewpoint, the product l×m (nm$^2$) may be 30,000 or less, 25,000 or less, 20,000 or less, or 15.000 or less. Thereby, the effect of this art can be suitably exhibited.

Furthermore, the ratio m/l (–) of the contact area length l to the maximum thickness m of the ion conductive layer 104 may be 0.002 or more, for example, 0.01 or more, for example 0.05 or more or 0.1 or more. However, in the ion conductive layer 104 having a contact area length l that is excessively large, the effect of promoting insertion/removal of lithium ions by the lithium-rich portion 104a and the lithium-deficient portion 104b formed in the vicinity of the interface with the metal oxide layer 106 is reduced. From such a viewpoint, the ratio m/l (–) may be 10 or less, 8 or less, or for example, 5 or less. Thereby, the effect of this art can be suitably exhibited.

In the present description, the length l is an arithmetic average value (mm) obtained by measuring the cross-sectional length of the contact surface between the ion conductive layer and the active material for 10 or more different ion conductive layers when an arbitrary cross section of the active material is observed with an electron microscope (for example, a transmission electron microscope). The maximum thickness m of the ion conductive layer is likewise an arithmetic average value (mm) obtained by measuring the maximum thickness of the ion conductive layer for 10 or more different ion conductive layers when an arbitrary cross section of the active material is observed with an electron microscope.

The product l×m is also an arithmetic average value (mm$^2$) obtained by measuring the product of the cross-sectional length of the contact surface between the ion conductive layer and the active material and the maximum thickness of the ion conductive layer for 10 or more different ion conductive layers when an arbitrary cross section of the active material is observed with an electron microscope.

Further, the ratio m/l is also an arithmetic average value (–) obtained by measuring the ratio of the maximum thickness of the ion conductive layer to the cross-sectional length of the contact surface between the ion conductive layer and the active material for 10 or more different ion conductive layers when an arbitrary cross section of the active material is observed with an electron microscope.

These values can be measured by, for example, preparing an observation sample in which a plurality of particles constituting the electrode material 100 is embedded in a resin, cutting the cross sections of the plurality of particles by cutting an arbitrary plane and observing with an electron microscope.

Such an electrode material 100 can be suitably manufactured by the following procedure which is, however, not limiting.

S1: A part of the surface of the active material particle 102 is covered with a lithium ion conductor to form the ion conductive layer 104.

S2: Next, another part of the surface of the active material particle 102 on which the ion conductive layer 104 has been formed is covered with a metal oxide, and the metal oxide layer 106 is formed so as to be adjacent to the ion conductive layer 104.

In some embodiments, where the electrode material 100 is a positive electrode material and the positive electrode active material particles 102 are made of a lithium transition metal oxide, the positive electrode active material particles 102 are produced by a crystallization method that is a liquid phase method. The crystallization method is generally a process in which, initially, a transition metal hydroxide corresponding to the composition of the target lithium transition metal oxide is prepared (crystallized) as a precursor by a liquid phase method, a lithium component is then added to the transition metal hydroxide and calculation is performed to obtain the target lithium transition metal oxide. After the precursor has been crystallized, a lithium ion conductor can be formed to obtain the ion conductive layer 104 on the surface of the active material particles 102 by adding a metal component of the lithium ion conductor together with the excessive lithium component and calcining. As a result of calcining, the composition and crystal structure of the active material particles 102 and, the ion conductive layer 104 can be appropriately prepared. The metal oxide layer 106 may be formed by a method that does not involve calculation at a high temperature after the ion conductive layer 104 has been formed. For example, the metal oxide layer 106 may be formed by a method mainly including a physical deposition (PVD) method such as a sputtering method, a reactive sputtering method, a plasma vapor deposition (PVD) method, or an ion plating method. In order to suitably form the metal oxide layer 106 on the surface of the active material particles 102, for example, a barrel sputtering method may be used.

As long as the ion conductive layer 104 and the metal oxide layer 106 are adjacent to each other on the surface of the positive electrode active material particle 102 (the layers are formed side by side), the metal oxide layer 106 may be laminated on a part of the ion conductive layer 104. However, the ratio of the metal oxide layer 106 overlying the ion conductive layer 104 may be a dimension within 5 times (within, for example, 3 times, 2 times, or even 1 time) the maximum thickness m. In the configuration in which the metal oxide layer 106 is overlaid in excess of 5 times the maximum thickness in, the lithium-rich portion 104a and the lithium-deficient portion 104b are formed so as to be inclined with respect to the surface of the positive electrode active material particle 102, the lithium ion donating property and lithium ion attracting property are degraded, and the resistance reduction effect at the time of charging and discharging cannot be suitably obtained.

In some embodiments, the positive electrode active material layer 34 is formed by bonding the particulate electrode material 100 with a binder (binding agent). The positive electrode active material layer 34 is also joined to the positive electrode current collector 32 with the binder. The positive electrode active material layer 34 may additionally include a conductive material in order to increase the electron conductivity between the particles of the electrode material 100. In a configuration including a conductive material, for example, a carbon material such as carbon black (for example, acetylene black or Ketone black), activated carbon, graphite, carbon fibers and the like can be suitably used as the conductive material. In some embodiments, for example, an acrylic resin such as a methacrylic acid ester polymer, a vinyl halide resin such as polyvinylidene fluoride (PVdF), a polyalkylene oxide such as polyethylene oxide (PEO), or the like can be used as, the binder. These may be used alone or in combination of two or more. Such a positive electrode active material layer 34 can be prepared by, for example, supplying a positive electrode slurry obtained by dispersing a positive electrode active material and a conductive material in an appropriate dispersion medium (for example, N-methyl-2-pyrrolidone) to the surface of the positive electrode current collector 32, and then drying to remove the dispersion medium.

The ratio of the positive electrode active material in the entire positive electrode active material layer 34 may be approximately 50% by mass or more, for example 60% by, mass or more, for example, 70% by mass or more, and for example 95% by mass or less, for example, 90% by mass or less. The ratio of the conductive material in the positive electrode active material layer 34 is, in some embodiments 0.1 parts by mass or more, 1 part by mass or more, for example, 3 parts by mass or more, and in some embodiments 15 parts by mass or less, 12 parts by mass or less, for example, 10 parts by mass or less with respect to 100 parts by mass of the positive electrode active material. The ratio of the binder in the positive electrode active material layer 34 is, in some embodiments 0.5 parts by mass or more, 1 part by mass or more, for example, 2 parts by mass or more, and in some embodiments 10 parts by mass or less, 8 parts by mass or less, for example, 5 parts by mass or less with respect to 100 parts by mass of the positive electrode active material. In some embodiments, the thickness of the positive electrode active material layer 34 after pressing (average thickness; the same applies hereinbelow) can be 10 μm or more, for example, 15 μm or more, and in some embodiments 50 μm or less, for example, 30 μm or less. In some embodiments, the density of the positive electrode active material layer 34 is not particularly limited, and in some embodiments, can be 1.5 g/cm$^3$ or more, for example, 2 g/cm$^3$ or more, and 3 g/cm$^3$ or less, for example 2.5 g/cm$^3$ or less.

In the present description, the "average particle diameter" is a cumulative 50% particle diameter ($D^{50}$) in a volume-based particle size distribution obtained by a laser diffraction scattering method, unless otherwise specified. In the particle size distribution, the particle diameter corresponding to 10% cumulative from the small particle diameter side is referred to as $D_{10}$, the particle diameter corresponding to 90% cumulative is referred to as $D_{90}$, and the maximum frequency diameter is referred to as $D_{max}$.

The negative electrode 40 is configured by providing a negative electrode active material layer 44 on a negative electrode current collector 42. The negative electrode current collector 42 is provided with a non-coated portion 42A for current collection in which the negative electrode active material layer 44 is not formed and the negative electrode current collector 42 is exposed. The negative electrode active material layer 44 includes a negative electrode active material. In some embodiments, particles of the negative electrode active material are bonded to each other with a binder (binding agent) and joined to the negative electrode current collector 42. The negative electrode active material occludes lithium ions, which are charge carriers, from the electrolyte and releases the lithium ions to the electrolyte along with charging/discharging. Various materials conventionally used as a negative electrode active material for lithium ion secondary cells can be used without any particular limitation as the negative electrode active material. Some embodiments include carbon-based materials typified by artificial graphite, natural graphite, amorphous carbon, composites thereof (for example, amorphous carbon-coated graphite) and the like, and materials that form an alloy with lithium, such as silicon (Si), lithium alloys (for example, LixM, M is C, Si, Sn, Sb, Al, Mg, Ti, Bi, Ge, Pb, P, and the like, X is a natural number), lithium storage compounds such as silicon compounds (SiO and the like), and the like. The negative electrode 40 can be prepared, for example, by supplying a negative electrode paste prepared by dispersing a particular negative electrode active material and a binder (for example, rubber such as styrene-butadiene copolymer (SBR), acrylic acid-modified SBR resin (SBR-based latex) and the like, cellulose-based polymers such as carboxymethyl cellulose (CMC), and the like) in a suitable dispersion medium (for example, water or N-methyl-2-pyrrolidone; water in one embodiment) to the surface of the, negative electrode current collector 42, and then drying to remove the dispersion medium. An electrically conductive member made of a metal having good conductivity (for example, copper, nickel, titanium, stainless steel, and the like) care be suitably used as the negative electrode current collector.

The averaae particle diameter ($D_{50}$) of the negative electrode active material particles is not particularly limited, and may be, for example, 0.5 μm or more, 1 μm or more, or 5 μm or more. The average particle diameter ($D_{50}$) may be 30 μm or less, 20 μm or less, or 15 μm or less. The ratio of the negative electrode active material in the entire negative electrode active material layer 44 is suitably about 50% by mass or more, and is 90% by mass to 99% by mass, for example, 95% $^{by,}$ mass to 99% by mass. When a binder is used, the ratio of the binder in the negative electrode active material layer 44 can be, for example, about 0.1 parts by mass to 5 parts by mass with respect to 100 parts by mass of the negative electrode active material, and usually 0.5 parts by mass to 2 parts by mass is appropriate. The thickness of the negative electrode active material layer 44 (average thickness; the same applies hereinbelow) is, for example, 10 μm or more, in some embodiments 20 μm or more, and can be 80 μm or less, in some embodiments 50 μm or less. The density of the negative electrode active material layer 44 is not particularly limited, but can be, for example, 0.8 g/cm$^3$ or more, in some embodiments 1.0 g/cm$^3$ or more, and 1.5 g/cm$^3$ or less, in some embodiments 1.4 g/cm$^3$ or less, for example 1.3 g/cm$^3$ or less.

The separator 50 is a component that insulates the positive electrode 30 and the negative electrode 40 and provides a movement path of charge carriers between the positive electrode active material layer 34 and the negative electrode active material layer 44. In some embodiments, such a separator 50 may be disposed between the positive electrode active material layer 34 and the negative electrode active material layer 44. The separator 50 may have a nonaqueous electrolyte holding function and a shutdown function for closing the charge carrier movement path at a predetermined temperature. Such a separator 50 can be suitably constituted by a microporeus resin sheet made of a resin such as polyethylene (PE), polypropylene (PP), polyester, cellulose, polyamide and the like. Among these, the microporous sheet made of polyolefn resin such as PE or PP can be suitably set to a shutdown temperature in the range of 80° C. to 140° C. (for example 110° C. to 140° C. for example, 120° C. to 135° C.). In some embodiments, the shutdown temperature is a temperature at which the electrochemical reaction of the cell is stopped when the cell generates heat, and the shutdown may be realized by melting or softening the separator 50 at this temperature. The separator 50 may have a single layer structure composed of a single material, or a structure (for example, a three-layer structure in which PP layers are laminated on both sides of a PE layer) in which two or more kinds of microporous resin sheets that differ in materials and properties (for example, average thickness, porosity, and the like) are laminated.

The thickness of the separator 50 (average thickness; the same applies hereinbelow) is not particularly limited, but usually can be 10 μm or more, in some embodiments 15 μm or more, for example, 17 μm or more. In some embodiments, the upper limit may be 40 μm or less, 30 μm or less, for example, 25 μm or less. When the average thickness of the base material is within the above ranges, satisfactory charge carrier permeability can be maintained, and a minute short circuit (leakage current) is less likely to occur. For this reason, input/output density and safety can be achieved at a high level.

In some embodiments, a solution obtained by dissolving or dispersing a supporting salt (for example, a lithium salt, a sodium salt, a magnesium salt, or the like; a lithium salt in a lithium ion secondary cell) as an electrolyte in a nonaqueous solvent may be used, without any particular limitation, as the nonaqueous electrolyte. Alternatively, a so-called polymer electrolyte, solid electrolyte, and the like which is obtained by adding a polymer to a liquid nonaqueous electrolyte to obtain a gelled state may be also used. Various organic solvents such as carbonates, ethers, esters, nitriles, sulfones, and lactones that have been used as an electrolyte in general lithium ion secondary cells can be used without any particular limitation as the nonaqueous solvent. Specific examples include chain carbonates such as ethylene carbonate (EC), diethyl carbonate (DEC), dimethyl carbonate (DMC); and ethyl methyl carbonate (EMU and cyclic carbonates such as propylene carbonate (PC) and the like. Such a nonaqueous solvent may be fluorinated. Moreover, nonaqueous solvents can be used singly or as a mixture of two or more. Various salts used for general lithium ion secondary cell can be appropriately selected and used as the supporting salt. For example, the use of a lithium salt such as $LiPF_6$, $LiBF_4$, $LiClO_4$, $LiAsF_6$, $Li(CF_3SO_2)_2N$, and $LiCF_3SO_3$ can be exemplified. Such supporting salts may be used singly or in combination of two or more. Such a supporting salt can be prepared so that the concentration in the nonaqueous electrolyte is within the range of 0.7 mol/L to 1.3 mol/L.

Further, the nonaqueous electrolyte may include various additives as long as the characteristics of the lithium ion secondary cell of the present disclosure are not impaired. As such an additive, a gas generating agent, a film forming agent, or the like can be used for one or two or more purposes among improvement of input/output characteristics of the cell, improvement of cycle characteristics, improvement of initial charge/discharge efficiency, and the like. Specific examples of such additives include fluorophosphates (for example, difluorophosphates, such as lithium difluorophosphate represented by $LiPO_2F_2$), oxalate complex compounds such as lithium bis(oxalato)borate (Li-BOB) and the like. The concentration of these additives relative to the entire nonaqueous electrolyte is suitably 0.1 mol/L or less (for example, 0.005 mol/L to 0.1 mol/L).

In the lithium ion secondary cell 1 described above, the active material including the ion conductive layer 104 and the metal oxide layer 106 is a positive electrode active material. However, the present art is not limited to this configuration. The ion conductive layer 104 and the metal oxide layer 106 may be disposed on the surface of the negative electrode active material particles. In the lithium ion secondary cell 1, at least one of the positive electrode 30 and the negative electrode 40 may be provided with an electrode including an active material provided with the ion conductive layer 104 and the metal oxide layer 106. A method for forming the ion conductive layer 104 and the metal oxide layer 106 on the surface of the negative electrode active material particles can be comprehended by a person skilled in the art by referring to the example relating to the positive electrode active material particles hereinabove.

Figure 2:
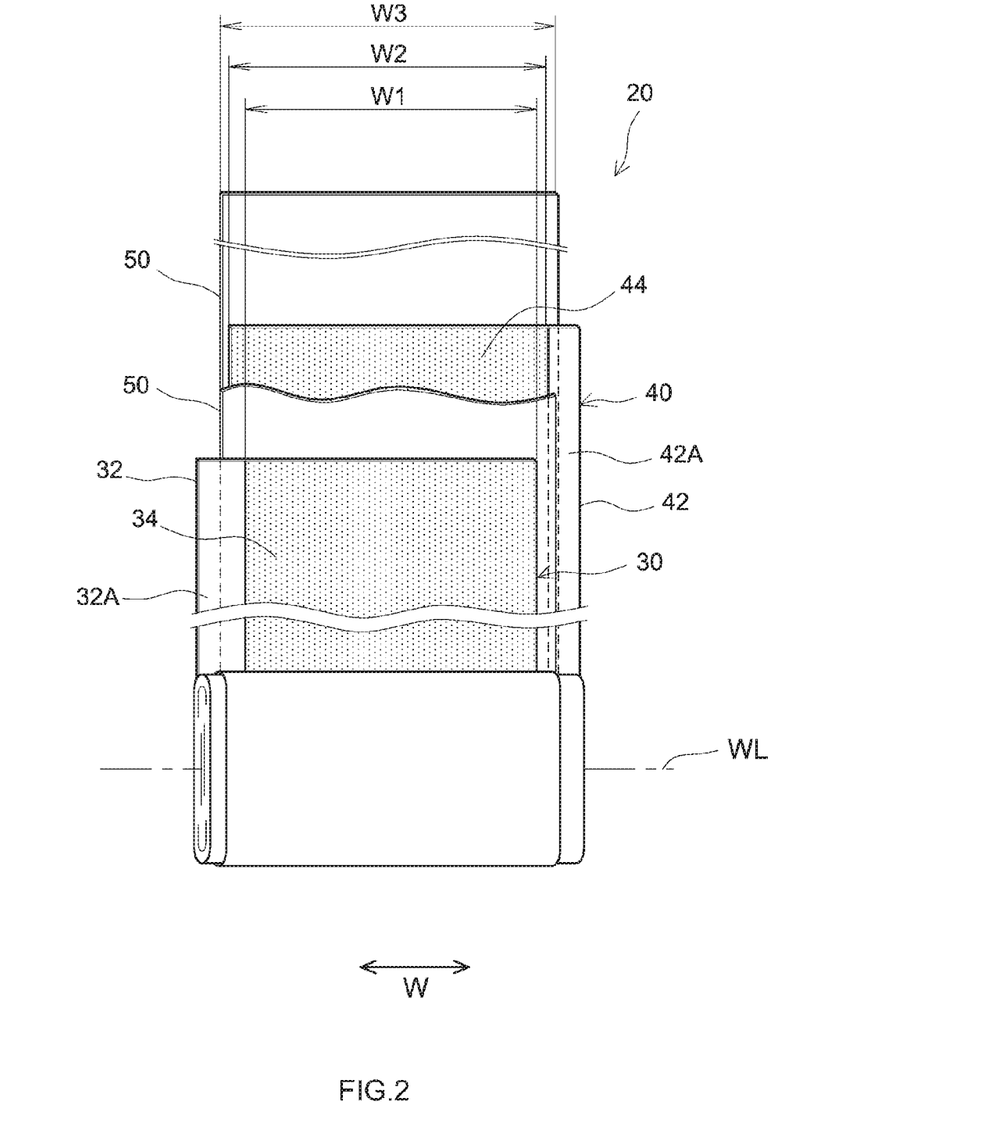
FIG. 2 is a partial perspective view illustrating the configuration of the wound electrode body according to an embodiment.

The lithium ion secondary cell 1 shown in FIG. 1 uses a flat angular cell case as the cell case 10. However, the cell case 10 may be a non-flat angular cell case, a cylindrical cell case, a coin-type cell case, or the like. Alternatively, the lithium ion secondary cell 1 may be a laminated bag thrilled in a bag shape by bonding a metal cell case sheet (for example, an aluminum sheet) and a resin sheet. For example, the cell case may be formed of aluminum, iron, alloys of these metals, high-strength plastic, or the like. The lithium ion secondary cell 1 shown in FIG. 1 is provided with, for example, a so-called wound electrode body 20 in the form obtained by laminating the long positive electrode 30 and negative electrode 40 in a state of being insulated from each other by two separators 50 and winding the laminate to obtain an elliptical cross section centered on a winding axis WL. As shown in FIG. 2, a width W1 of the positive electrode active material layer 34, a width W2 of the negative electrode active material layer 44, and a width W3 of the separator satisfy the relationship of W1<W2<W3. The negative electrode active material layer 44 covers the positive electrode active material layer 34 at both ends in the width direction, and the separator 50 covers the negative electrode active material layer 44 at both ends in the width direction. However, the electrode body 20 of the lithium ion secondary cell 1 disclosed herein is not limited to a wound electrode body, and may be, for example, a so-called flat-plate laminate type (also referred to as a wafer type) in the form obtained by laminating a plurality of positive electrodes 30 and negative electrodes 40, each pair being insulated by a separator 50. Alternatively, a unit cell in which one positive electrode 30 and one negative electrode 40 are housed in a cell case may be used. Further, the cell case 10 may be provided with a safety valve for discharging gas generated inside the cell case to the outside, a liquid injection port for injecting an electrolyte, and the like, similar to the cell cases of the conventional lithium ion secondary cells.

In the lithium ion secondary cell 1 shown in FIG. 1, the positive electrode 30 and the negative electrode 40 are insulated by two separators 50, and a nonaqueous electrolyte is used as the electrolyte. However, instead of the combination of the separator 50 and the electrolyte, a solid electrolyte may be used as the electrolyte. For example, various solid electrolytes that can be used in a known all-solid lithium ion cell can be used as the solid electrolyte. In addition, in some embodiments, the cell case 10 may be provided with a positive electrode terminal 38 and a negative electrode terminal 48 far external connection the terminals being insulated from the cell case 10. The positive electrode terminal 38 and the negative electrode terminal 48 are electrically connected to the non-coated portion 32A of the positive electrode 30 and the non-coated portion 42A of the negative electrode 40 through the positive electrode current collecting terminal 38a and the negative electrode current collecting terminal 48a, respectively, and are configured to enable the supply of electric power to an external load.

The lithium ion secondary cell disclosed herein can be used for various applications, and by contrast with the conventional products, this cell can have a low resistance and maintain a high capacity retention ratio even when a large capacity is repeatedly charged and discharged at a high rate. Moreover, such excellent cell characteristics can be both achieved at a high level. Therefore, by taking advantage of such characteristics, the secondary cell disclosed herein can be used in one embodiment, in applications that require high energy density and high input/output density and applications that require high reliability. Examples of such applications include drive power supplies mounted on vehicles such as plug-in hybrid vehicles, hybrid vehicles, electric vehicles and the like. Further, in some embodiments, such secondary cells may be used. in the form of a cell pack in which a plurality of cells is connected in series and/or in parallel.

Hereinafter, some examples relating to the present disclosure will be described, but the present disclosure is not intended to be limited to such examples.

Preparation of Cathode Material

EXAMPLE 1

Sulfates of nickel, cobalt, and manganese were dissolved in ion exchanged water so that the molar ratio of Ni:Co: Mn was 1:1:1, and were neutralized with sodium hydroxide to crystallize the precursor of the positive electrode active material. Lithium hydroxide was added to and mixed with the aqueous solution including the precursor, and then aqueous diammonium hydrogen phosphate solution was added and mixed at a predetermined ratio. The mixture was dried with an evaporator, calcined at 800° C. for 15 hours, and pulverized to obtain a powder material having an average particle diameter of 10 µm. As a result of XRD analysis of this powder material, it was confirmed that $Li_3PO_4$ as an ion conductor precipitated and formed a coating layer on the surface of lithium nickel cobalt manganese composite oxide (layered rock salt crystal structure, $LiN_{0.33}Co_{0.33}Mn_{0.33}O_2$: LNMC) as a positive electrode active material at a ratio of 0.5 part by mass with respect to 100 parts by mass of LNMC. Then, using a barrel sputtering apparatus, a $TiO_2$ layer was formed on the surface of the powder material by sputter coating under the conditions of the target plate: $TiO_2$ and the reaction gas: oxygen-containing Ar gas, while rotating the obtained powder material. A positive electrode material of Example 1 in which a $Li_3PO_4$ layer and a $TiO_2$ layer were provided on the surface was thus obtained.

EXAMPLES 2 to 7

An aqueous ammonium sulfate solution (Example 2), an aqueous ammonium tungstate solution (Example 3), an aqueous sodium silicate solution (Example 4), an aqueous cobalt (II) chloride solution (Example 5), an aqueous ammonium aluminate solution (Example 4), and an aqueous titanium chloride solution (Example 7) were used instead of the aqueous diammonium hydrogen phosphate solution added to the aqueous precursor solution in Example 1. As a result, positive electrode materials were obtained that included lithium sulfate ($Li_2SO_4$) (Example 2). lithium tungstate ($Li_2WO_4$) (Example 3), lithium silicate ($Li_2SiO_3$) (Example 4), lithium cobaltate ($Li_2CoO_2$) (Example 5), lithium aluminate ($LiAlO_2$) (Example 6), and lithium titanate ($Li_4Ti_5O_{12}$) (Example 7) instead of $Li_3PO_4$ in the positive electrode material of Example 1.

EXAMPLES 8 to 10

Barrel sputtering was performed by replacing the target plate in barrel sputtering in Example 1 with an $Al_2O_3$ plate (Example 8), a $SiO_2$ plate (Example 9), and a $WO_3$ plate (Example 10). As a result, positive electrode materials were obtained in which a metal oxide layer composed of $Al_2O_3$ (Example 8), $SiO_2$ (Example 9), and $WO_3$ (Example 10) was respectively provided instead of the $TiO_2$ layer on the surface of the powder material.

EXAMPLES 11 to 15

Positive electrode materials in which $Li_3PO_4$ precipitated at a ratio of 0.03 to 6 parts by mass with respect to 100 parts by mass of INMC, as shown in Table 1 hereinbelow, were formed by increasing or decreasing the amount of the aqueous diammomum hydrogen phosphate solution added to the aqueous solution including the precursor in Example 1.

EXAMPLES 16 to 19

Positive electrode materials in which the ratio and precipitation form of $Li_3PO_4$ precipitated on LNMC were changed were obtained by increasing or decreasing the amount of the aqueous diammonium hydrogen phosphate solution added to the aqueous solution including the precursor in Example 1 and variously changing the pH of the solution when lithium hydroxide and aqueous diammonium hydrogen phosphate solution were added. Specifically, as shown in Table 1 below, $Li_3PO_4$ was precipitated at a ratio of 0.02 to 20 parts by mass with respect to 100 parts by mass of LNMC, the precipitation state of $Li_3PO_4$ on the surface of LNMC was changed, and the parameter "1×m" was adjusted to be 100 to 20,000.

EXAMPLE 20

In Example 1, in addition to the aqueous diammonium hydrogen phosphate solution added to the aqueous precursor solution, an aqueous ammonium sulfate solution (Example 20) was subsequently added. As a result, a positive electrode material in which an ion conductive coating layer composed of $Li_3PO_4$ and $Li_2SO_4$ (Example 20) was formed instead of the $Li_3PO_4$ layer was formed on the surface of the powder material was obtained.

EXAMPLE 21

Barrel sputtering was performed using a Ti plate and an Al plate as the target plate in barrel sputtering in Example 1. As a result, a positive electrode material in which a composite metal oxide layer composed of $Al_2O_3$ and $TiO_2$ was provided instead of the $TiO_2$ layer on the surface of the powder material was obtained.

EXAMPLES 22 to 24

A positive electrode material (Example 22) which as not provided with the $Li_3PO_4$ layer or $TiO_2$ layer, and was composed only of LNMC was obtained by neither adding the aqueous diammonium hydrogen phosphate solution nor performing barrel sputtering in Example 1.

A positive electrode material (Example 23) which was provided with the $Li_3PO_4$ layer, did not include the $TiO_2$ layer and was composed of LNMC was obtained by not performing barrel sputtering in Example 1.

A positive electrode material (Example 24) which was provided with the TiO$_2$ layer, did not include the Li$_3$PO$_4$ layer, and was composed of LNMC was obtained by not adding the aqueous diammonium hydrogen phosphate solution in Example 1.

EXAMPLE 25

In Example 1, after the crystallization of the precursor of the positive electrode active material, the precursor was taken out from the aqueous solution, and a TiO$_2$ layer was formed on the surface of the precursor powder material by barrel sputtering under the same conditions as in Example 1. Thereafter, the precursor provided with the TiO$_2$ layer was returned to the aqueous solution, followed by adding and mixing lithium hydroxide, and then adding and mixing the aqueous diammonium hydrogen phosphate solution at a predetermined ratio. Then, drying was performed with an evaporator, followed by calcination for 15 hours at 800° C. and pulverization. As a result, a powder material having an average particle diameter of 10 µm was obtained. XRD analysis of this powder material confirmed that Li$_3$PO$_4$ and Li$_4$Ti$_5$O$_{12}$ as ion conductors were precipitated to form a coating layer on the surface of LNMC similar to Example 1 at a total ratio of 0.5 parts by mass with respect to 100 parts by mass of LNMC. A positive electrode material of Example 25 provided with a Li$_3$PO$_4$ layer and a TiO$_2$ layer on the surface was thus obtained.

Production of Secondary Cell

The positive electrode material (ENCM) prepared in each of the above examples, acetylene black (AB) as a conductive material, and polyvinylidene fluoride (PVdF) as a binder were mixed at a mass ratio of LNCM:AB:PVdF=80:8:2 and kneaded with N-methyl-2-pyrrolidone (NMP) as an organic solvent to prepare a positive electrode paste. The obtained positive electrode paste was coated with a die-coater on the surface of an aluminum foil as a positive electrode current collector, dried and rolled to thrill a positive electrode active material layer and obtain a positive electrode.

A natural graphite powder (C) having an average particle diameter of 20 µm as a negative electrode active material, a styrene butadiene copolymer (SBR) as a binder, and carboxymethyl cellulose (CMC) as a thickener were mixed at a mass ratio of C:SBR:CMC=98:1:1 and kneaded with ion exchange water as a dispersion medium to prepare a negative electrode paste. The obtained negative electrode paste was coated on the surface of a copper foil as a negative electrode current collector, dried and rolled to form a negative active material layer and obtain a negative electrode.

The prepared positive and negative electrodes were laminated with a separator interposed therebetween, and the laminate was wound and housed together with a nonaqueous electrolyte in an angular cell case made of aluminum, thereby constructing a lithium ion secondary cell for evaluation of each example. A microporous sheet having a three-layer structure made of polypropylene (PP)/polyethylene (PE)/polypropylene (PP) having an air resistance of 300 seconds as measured by a Gurley test method was used as the separator. In addition, a solution obtained by dissolving LiPF$_6$ as an electrolyte to a concentration of 1 mol/L in a mixed solvent obtained by mixing ethylene carbonate (EC), dimethyl carbonate (DMC) and ethyl methyl carbonate (EMC) mixed at a volume ratio of EC:DMC:EMC=30:40:30 was used as the nonaqueous electrolyte.

Evaluation

Initial Capacity

A lithium ion secondary cell of each example was hilly charged by constant-current charging at a rate of ⅓ C until the cell voltage reached 4.2 V and then by constant-voltage charging until the current value reached ⅓ C in a thermostat at 25° C. Then, the capacity when constant-current discharge was carried out at a rate of ⅓ C until the cell voltage became 3.0 V was measured and taken as the initial capacity.

Cell Resistance

The initial capacity was taken as a charge depth (state of charge: SOC) of 100%, constant-current charging was performed at 0.3 C to a SOC of 30% in a thermostat at 25° C., discharge was performed at a rate of 5 C, 15 C. 30 C, and 45 C, and a cell voltage after 10 seconds was measured. Each curlew value and each voltage value at this time were plotted to obtain an 1-V characteristic at the time of discharge, and the resistance (Ω) at the time of discharge was found from the slope of the obtained straight line and taken as the initial resistance. These initial resistances are shown in the "Cell resistance" column of Table 1 below as relative values, the resistance of the cell of Example 22 being taken as 100.

Capacity Retention Ratio

In a thermostat at 60° C., 500 cycles of charging and discharging between 4.2 and 3.0 V were performed at a charging/discharging rate of 2 C for the lithium ion secondary cell of each example. At this time, the discharge capacities of the first cycle and the 500th cycle were measured, and the ratio (%) of the discharge capacity of the 500th cycle to the discharge capacity of the first cycle was calculated. The results are shown in the "Capacity retention ratio" column in Table 1.

Form a Coating Layer

The configuration of prepared positive electrode material of each example was studied in detail by observing under a transmission electron microscope (TEM). Specifically, the positive electrode material of each example was embedded in an epoxy resin and sliced with an ultramicrotome to prepare a TEM observation sample of the cross section of the positive electrode active material particles, which was used for observation. The layer (ion conductive layer) composed of the ion conductor formed on the surface of the positive electrode active material particle of each example was determined from an electron diffraction image, and the length (observation surface length) l of the contact surface of the ion conductive layer and positive electrode active material particle and the maximum thickness in of the ion conductive layer were measured. Then, from these measured values, the product (l×m) and quotient (m/l) of the contact surface length l and the maximum thickness in of the ion conductive layer were calculated. The results are shown in the "l*m" and "m/l" columns in Table 1.

Electronegativity of Ion Conductive Layer

Ion conductivities χM and χM' of the central element in the ion conductor and/or the metal oxide were studied for the prepared positive electrode material of an example including a layer made of an ion conductor (ion conductive layer) and/or a layer made of a metal oxide (metal oxide layer) among all the examples. The results are shown in the "χM" and "χM'" columns in Table 1.

TABLE 1

| | Lithium ion conductor | | | | Metal oxide | | | Difference in χ (—) | Cell resistance (—) | Capacity retention ratio (%) |
|---|---|---|---|---|---|---|---|---|---|---|
| Example | Material | $\chi_M$ | Ratio [parts] | l*m [nm$^2$] | m/l [—] | Material | $\chi_M{}'$ | Ratio [parts] | | | |
| 1 | $Li_3PO_4$ | 2.19 | 0.5 | 150 | 0.06 | $TiO_2$ | 1.54 | 0.5 | −0.65 | 66 | 90 |
| 2 | $Li_2SO_4$ | 2.58 | 0.5 | 150 | 0.06 | $TiO_2$ | 1.54 | 0.5 | −1.04 | 60 | 90 |
| 3 | $Li_2WO_4$ | 2.36 | 0.5 | 150 | 0.06 | $TiO_2$ | 1.54 | 0.5 | −0.82 | 63 | 90 |
| 4 | $Li_2SiO_3$ | 1.90 | 0.5 | 150 | 0.06 | $TiO_2$ | 1.54 | 0.5 | −0.36 | 68 | 90 |
| 5 | $LiCoO_2$ | 1.88 | 0.5 | 150 | 0.06 | $TiO_2$ | 1.54 | 0.5 | −0.34 | 70 | 90 |
| 6 | $LiAlO_2$ | 1.61 | 0.5 | 150 | 0.06 | $TiO_2$ | 1.54 | 0.5 | −0.07 | 72 | 90 |
| 7 | $Li_4Ti_5O_{12}$ | 1.54 | 0.5 | 150 | 0.06 | $TiO_2$ | 1.54 | 0.5 | 0 | 85 | 90 |
| 8 | $Li_3PO_4$ | 2.19 | 0.5 | 150 | 0.06 | $Al_2O_3$ | 1.61 | 0.5 | −0.58 | 68 | 90 |
| 9 | $Li_3PO_4$ | 2.19 | 0.5 | 150 | 0.06 | $SiO_2$ | 2.58 | 0.5 | 0.39 | 85 | 90 |
| 10 | $Li_3PO_4$ | 2.19 | 0.5 | 150 | 0.06 | $WO_2$ | 2.36 | 0.5 | 0.17 | 85 | 90 |
| 11 | $Li_3PO_4$ | 2.19 | 0.03 | 150 | 0.06 | $TiO_2$ | 1.54 | 0.03 | −0.65 | 82 | 86 |
| 12 | $Li_3PO_4$ | 2.19 | 0.05 | 150 | 0.06 | $TiO_2$ | 1.54 | 0.05 | −0.65 | 70 | 88 |
| 13 | $Li_3PO_4$ | 2.19 | 3 | 150 | 0.06 | $TiO_2$ | 1.54 | 3 | −0.65 | 63 | 92 |
| 14 | $Li_3PO_4$ | 2.19 | 5 | 150 | 0.06 | $TiO_2$ | 1.54 | 5 | −0.65 | 70 | 94 |
| 15 | $Li_3PO_4$ | 2.19 | 6 | 150 | 0.06 | $TiO_2$ | 1.54 | 6 | −0.65 | 32 | 95 |
| 16 | $Li_3PO_4$ | 2.19 | 0.02 | 100 | 0.04 | $TiO_2$ | 1.54 | 0.5 | −0.65 | 82 | 86 |
| 17 | $Li_3PO_4$ | 2.19 | 0.2 | 1000 | 0.004 | $TiO_2$ | 1.54 | 0.5 | −0.65 | 70 | 92 |
| 18 | $Li_3PO_4$ | 2.19 | 2 | 10000 | 0.0004 | $TiO_2$ | 1.54 | 0.5 | −0.65 | 72 | 94 |
| 19 | $Li_3PO_4$ | 2.19 | 20 | 20000 | 0.0002 | $TiO_2$ | 1.54 | 0.5 | −0.65 | 32 | 95 |
| 20 | $Li_3PO_4$, $Li_2SO_4$ | 2.19, 2.58 | 0.5 | 150 | 0.06 | $TiO_2$ | 1.54 | 0.5 | −0.85 | 63 | 90 |
| 21 | $Li_3PO_4$ | 2.19 | 0.5 | 150 | 0.06 | $TiO_2$, $Al_2O_3$ | 1.54, 1.61 | 0.5 | −0.62 | 67 | 90 |
| 22 | — | — | — | — | — | — | — | — | — | 100 | 80 |
| 23 | $Li_3PO_4$ | 2.19 | 0.5 | 150 | 0.06 | — | — | — | — | 90 | 83 |
| 24 | — | — | — | — | — | $TiO_2$ | 1.54 | 0.5 | — | 110 | 85 |
| 25 | $Li_4Ti_5O_{12}$, $Li_3PO_4$ | 1.54, 2.19 | 0.5 | 150 | 0.06 | — | — | — | — | 90 | 83 |

As shown in Table 1, the cell of Example 22 is an example using a positive electrode active material without any coating layer, and the cell of Example 24 is an example using a positive electrode active material in which a coating layer (metal oxide layer) made of an insulating metal oxide is provided but a coating layer (ion conductive layer) made of a lithium ion conductor is not provided. These cells have a clearly higher cell resistance than all other cells. Meanwhile, Examples 1 to 21, 23 and 25 used a positive electrode active material provided with an ion conductive layer, and the cell resistance is clearly lower than that of the cells of Examples 22 and 24. From this, it was confirmed that the cell resistance can be reduced by providing the positive electrode active material at least with the ion conductive layer. Although the cell of Example 24 is not provided with the ion conductive layer, a positive electrode active material provided with a metal oxide layer is used. Since the cell resistance of Example 24 is higher than the cell resistance of Example 22, it was found that where the positive electrode active material is provided with a metal oxide layer alone, the metal oxide layer becomes a simple resistance component and, on the contrary, the cell resistance is increased.

Further, although the positive electrode active materials of the cells of Examples 23 and 25 are provided with an ion conductive layer, a metal oxide layer is not provided, and the cell resistance (relative value, the same applies hereinbelow) is about 90. Meanwhile, the positive electrode active materials of the cells of Examples 1 to 21 are provided with both the ion conductive layer and the metal oxide layer, and the cell resistance is reduced to a low value of 85 or less. From these facts, it was confirmed that where the positive electrode active material includes a metal oxide layer in combination rather than an ion conductive layer alone, the cell resistance can be further reduced (for example, reduced to 85% or less). This can be said to be an effect that cannot be easily conceived of from the characteristics of the metal oxide layer that becomes a resistance when present alone.

When a positive electrode active material is provided with both an ion conductive layer and a metal oxide layer, where the positive electrode active material or the ion conductive layer is made of an oxide as in the present embodiment, the composition and crystal structure thereof can be adjusted to some extent by finally performing calcination. As shown in Example 25, it was confirmed that where the metal oxide layer is formed before the ion conductive layer, and thus the calcination treatment for introducing lithium with lithium hydroxide is performed in the presence of the metal oxide layer, the metal oxide layer reacts with, lithium and changes into a corresponding ion conductor. In other words, it was found that the intended metal oxide layer could not be formed on the surface of the positive electrode active material. For these reasons, when forming the ion conductive layer and the metal oxide layer on the positive electrode active material, the positive electrode active material and the ion conductive layer may be formed initially and then the introduction of lithium ions may be completed, so that the calcination treatment is not performed after the formation of the metal oxide layer and the formation a the metal oxide layer is, not accompanied by the calcination. It was found that the positive electrode material can be suitably obtained by, for example, initially forming a positive electrode active material and an ion conductive layer by a liquid phase method and then forming a metal oxide layer by a physical (or chemical) method such as sputtering.

As shown in Examples 1 to 7, it was found that where the ion conductive layer is configured of a material exhibiting ion conductivity, the cell resistance can be reduced regardless of the composition. Further, as shown in Examples 1 and 8 to 10, it was found that the metal oxide layers provided in combination also contribute to the reduction of cell resistance regardless of the composition. Where a more detailed investigation was conducted, it was found that the cell resistance of the cells of Examples 1 to 7 is highest the ion conductive layer is made of lithium titanate ($Li_4Ti_5O_{12}$) that has a relatively small electronegativity of the central element, and the cell resistance tends to decrease in the order of electronegativity of lithium aluminate ($LiAlO_2$), lithium cobaltate ($LiCoO_2$), lithium silicate ($Li_2SiO_3$), lithium phosphate ($Li_3PO_4$), lithium tungstate ($Li_2WO_4$), and lithium sulfate ($Li_3SO_4$) having a relatively large electronegativity $\chi M$. It was further found that the cell resistance is relatively high when the metal oxide layer is composed of silicon oxide of Example 9 and tungsten oxide of Example 10 that have the electronegativity $\chi M'$ of the central element relatively larger than the electronegativity $\chi M$ of the central element of the ion conductive layer, or of titanium oxide of Example 7 having the electronegativity of the central element equal to that of the central element of the ion conductive layer, and that the cell resistimce becomes relatively low in the case of aluminum oxide of Example 8 for which the electronegativity $\chi M'$ of the central element of the metal oxide layer is relatively smaller than the electronegativity $\chi M$ of the central element of the ion conductive layer. From these facts, it was found that the effect of reducing the cell resistance tends to be higher when the metal oxide layer has a smaller electronegativity $\chi$ of the central element than the ion conductive layer. Although this electronegativity difference $\Delta\chi 0$ is not strictly limited, for example, it may be $\Delta\chi \leq 0$, in some embodiments $\Delta\chi < 0$, and in some embodiments $\Delta\chi \leq -0.1$, $\Delta\chi \leq -0.3$, $\Delta\chi \leq -0.5$, $\leq\chi\leq -0.6$, $\Delta\chi \leq -0.8$, $\Delta\chi \leq -1$ and the like.

As shown in Examples 1 and 11 to 15, it was found that the cell resistance and the capacity retention ratio change depending on the amount of the ion conductive layer. it was found that the capacity retention ratio tends to increase as the amount of the ion conductive layer increases, since the capacity to occlude ions as charge carriers can be expanded. From the viewpoint of capacity retention ratio, in some embodiments, the ion conductive layer may be present in a larger amount. In Examples 11 to 15, the amount of the ion conductive layer and the amount of the metal oxide layer are made equal. As can be seen from the values of the product l×m and the quotient m/l, in Examples 11 to 15, as the amount of the ion conductive layer and the metal oxide layer increases, the number (frequency) of the active material particles in the ion conductive layer and the metal oxide layer increases. In such a case, as seen in Examples 11 to 13, it was found that the cell resistance increases to some extent as the amount of the ion conductive layer and the metal oxide layer increases. However, as seen in Examples 13 to 15, it has been found that the effect of reducing the cell resistance is eliminated when the amount of the ion conductive layer and the metal oxide layer becomes excessive. The cell resistance is lowest when the amount of the ion conductive layer and the metal oxide layer is in the vicinity of 3 parts by mass (Example 13) with respect to 100 parts by mass of the positive electrode active material, and tends to increase with increasing separation from this value. In other words, it was found that from the viewpoint of cell resistance, an excessive amount of the ion conductive layer and the metal oxide layer can be a resistance component that increases cell resistance. Therefore, from the viewpoint of achieving, both cell resistance and, capacity retention ratio, the ratio of the ion conductive layer to 100 parts by mass of the positive electrode active, material may be, for example, more than 0.5 parts by mass and equal to or less than 5 parts by mass, and may be exemplified by about 0.5 to 4 parts by mass (for example, about 3 parts by mass).

Further, as shown in Examples 1 and 16 to 19, it was found that the cell resistance and the capacity retention ratio change also depending on the shape of the ion conductive layer. The ion conductive layers of Examples 16 to 19 are all uniform with a thickness of about 2 nm, but the length I of the contact interface between the ion conductive layer and the positive electrode active material differs from 50 to 10,000 nm. It was found that even in cells using positive electrode active materials provided with ion conductive layers having such different shapes, the capacity retention ratio increases as the amount of the ion conductive layer increases.

Since the cell resistance is approximately the same when the product l×m of the length l and the thickness m of the ion conductive layer is 20,000 (Example 191 and 100 (Example 16), the ion conductive layer may be contact with the positive electrode active material layer with a somewhat large area and thickness within a range of l×m, for example, of about 100 to 20,000 depending on required characteristics. This is considered to be because where l×m is large, the ion conductive layer can easily and suitably form a layered crystal structure suitable for occlusion and release of lithium ions. However, where the length I is excessively large compared to the thickness m of the ion conductive layer, the resistance reduction effect is decreased instead. Therefore, it was found that l×m may be 15,000 or less, for example 10,000 or less, and may be 5000 or less. It was also found that the cell resistance increases when l×m is 150 or less. Therefore, it was found that l×m may be larger than 100, for example, about 150.

Further, m/l may be 0.0001 or more, for example 0.0002 or more, 0.0004 or more, for example, 0.001 or more. However, the contact area length I of the ion conductive layer 104 may not so large because the effect of promoting lithium ion insertion and removal exhibited by the formed lithium-rich portion 104a and lithium-deficient portion 104b is reduced. From such a viewpoint, the ratio m/l (−) is suitably 1 or less, may be 0.1 or less, for example 0.01 or less, and may be, for example, 0.04 or less.

Although the present disclosure has been described in detail above, the above-described embodiments and examples are merely exemplary, and the disclosure disclosed herein includes various modifications and changes of the above specific examples.

What is claimed is:

1. A lithium ion secondary cell comprising:
   an electrode including an active material, the active material comprising on the surface thereof, two coating layers of a metal oxide layer including a metal oxide and an ion conductive layer including a lithium ion conductor; wherein
   the metal oxide layer and the ion conductive layer are adjacent to each other; and
   where the diameter of the active material particle in the cross section is denoted by D, the length 1 of the contact surface between the active material particle and the ion conductive layer in the cross section of the electrode material is 1.6×D or less.

2. The lithium ion secondary cell according to claim 1, wherein the metal oxide includes at least one selected from the group consisting of titanium oxide, aluminum oxide, silicon dioxide, and tungsten oxide.

3. The lithium ion secondary cell according to claim 1, wherein the lithium ion conductor includes at least one selected from the group consisting of lithium phosphate, lithium sulfate, lithium tungstate, lithium silicate, lithium cobaltate, lithium aluminate, and lithium titanate.

4. The lithium ion secondary cell according to claim 1, wherein where an electronegativity of a central element of the metal oxide is denoted by $\chi M$ and an electronegativity of a central element of the lithium ion conductor is denoted by $\chi M'$, these satisfy $\chi M < \chi M'$.

5. The lithium ion secondary cell according to claim 1, wherein where the active material is taken as 100 parts by mass, the ion conductive layer is 0.05 parts by mass or more and 5 parts by mass or less.

6. The lithium ion secondary cell according to claim 1, wherein when a cross section of the active material is observed, the product l×m (nm$^2$) of a length l (nm) of a contact surface between the ion conductive layer and the active material and the maximum thickness m (nm) of the ion conductive layer satisfies $100 \leq l \times m \, 20,000$.

7. A method for producing an active material for a lithium ion secondary cell, comprising:

coating a part of a surface of active material particles capable of occluding and releasing lithium ions with a lithium ion conductor to form an ion conductive layer, and then coating another part of the surface of the active material particles where the ion conductive layer has been formed with a metal oxide to form a metal oxide layer adjacent to the ion conductive layer;

where the diameter of the active material particle in the cross section is denoted by D, the length l of the contact surface between the active material particle and the ion conductive layer in the cross section of the electrode material is 1.6×D or less.

8. The lithium ion secondary cell according to claim 1, wherein a part of the surface of the active material is exposed.

9. The lithium ion secondary cell according to claim 3, wherein the ion conductive layer does not contain vanadium.

* * * * *